United States Patent [19]
Gee et al.

[11] Patent Number: 5,459,636
[45] Date of Patent: Oct. 17, 1995

[54] POSITION AND ORIENTATION ESTIMATION NEURAL NETWORK SYSTEM AND METHOD

[75] Inventors: Allen Gee, Van Nuys; David M. Doria, Lakewood, both of Calif.

[73] Assignee: Hughes Aircraft Company, Los Angeles, Calif.

[21] Appl. No.: 186,181

[22] Filed: Jan. 14, 1994

[51] Int. Cl.⁶ .................................................. G06K 9/00
[52] U.S. Cl. ........................... 364/516; 395/21; 382/199; 382/302
[58] Field of Search .................................. 382/14, 15, 42, 382/45, 48, 49, 22; 395/21, 22, 903; 364/516

[56] References Cited

U.S. PATENT DOCUMENTS

| | | | |
|---|---|---|---|
| 5,227,830 | 7/1993 | Yoshihara et al. | 354/402 OL |
| 5,311,600 | 5/1994 | Aghajan et al. | 382/22 R |
| 5,333,210 | 7/1994 | Spirkovska et al. | 382/15 |
| 5,351,311 | 9/1994 | Rogers et al. | 382/14 |

OTHER PUBLICATIONS

Wei; "Object Recognition by Neural Networks"; Dissertation Abstracts International; vol. 51/04–B p. 1924. 143 pp; 1990.

*Primary Examiner*—Emanuel T. Voeltz
*Assistant Examiner*—Kamini Shah
*Attorney, Agent, or Firm*—H. P. Gortler; M. W. Sales; W. K. Denson-Low

[57] ABSTRACT

Disclosed are a system and method for determining the pose (translation, rotation, and scale), or position and orientation, of a model object that best matches a target object located in image data. Through an iterative process small adjustments are made to the original position and orientation of the model object until it converges to a state that best matches the target object contained in the image data. Edge data representative of edges of the target object and edge data representative of the model object are processed for each data point in the model object relative to each point in the target object to produce a set of minimum distance vectors between the model object and the target object. A neural network estimates translation, rotation, and scaling adjustments that are to be made to the model object. Pose of the model object is adjusted relative to the target object based upon the estimated translation, rotation, and scaling adjustments provided by the neural network. Iterative calculation of the minimum distance vectors, estimation of the translation, rotation, and scaling adjustments, and adjustment of the position and orientation of the model object is adapted to reposition the model object until it substantially overlays the target object. Final position of the model object provides an estimate of the position and orientation of the target object in the digitized image.

13 Claims, 8 Drawing Sheets

IMAGE DATA

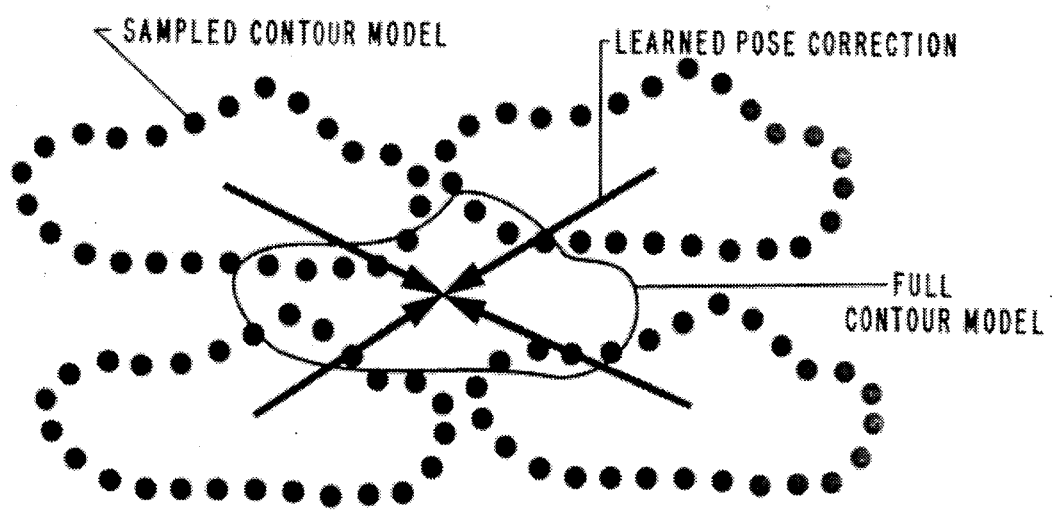
Fig. 7.
Fig. 9
(PRIOR ART)
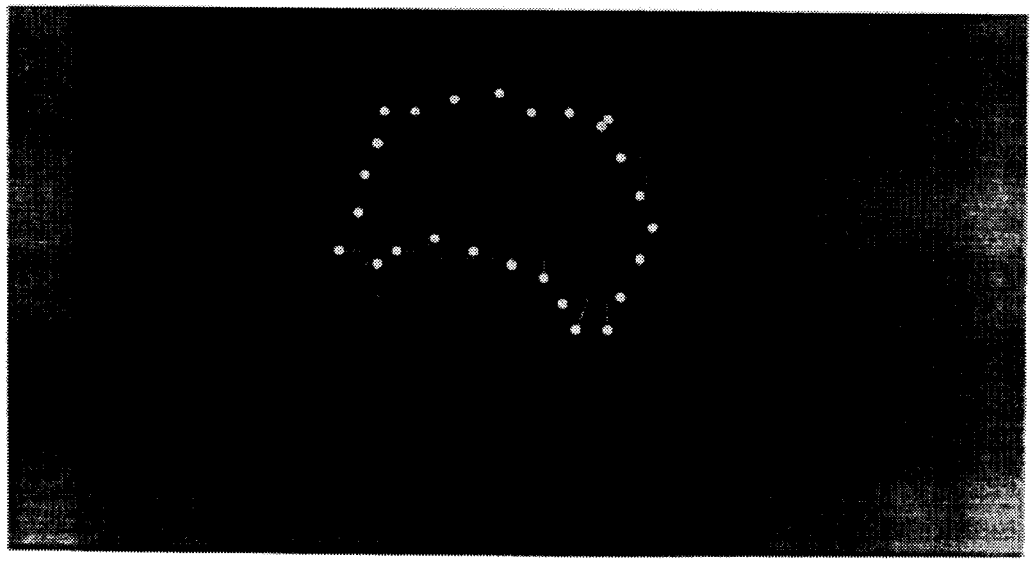

POSITION AND ORIENTATION ESTIMATION NEURAL NETWORK SYSTEM AND METHOD

The present invention was developed with support under Contract No. F33615-91-C-1723 awarded by the U.S. Air Force. The U.S. Government has certain rights in this invention.

BACKGROUND

The present invention relates generally to neural network systems and methods and, more particularly, to a position and orientation estimation neural network system and processing method that may be employed in an automatic target recognition system.

There are several conventional approaches that have been used to estimate the position and orientation of objects in computer vision applications, and particularly in automatic target recognition applications. The gradient descent approach is commonly used to solve object recognition problems of this type. However the gradient descent approach has the problem of getting stuck in "local minima" and thus produces poor solutions. The gradient descent and exhaustive search approaches are also computationally inefficient, and are difficult to implement on a real time hardware system. Furthermore, the conventional approaches do not provide practical solutions within high-dimensional problem spaces.

Accordingly, it is an objective of the present invention to provide a position and orientation estimation neural network system that overcomes the limitations of conventional approaches. It is also an objective of the present invention to provide a position and orientation estimation neural network system that may be employed in an automatic target recognition system.

SUMMARY OF THE INVENTION

The present invention is a position and orientation estimation neural network system and processing method that determines the pose (translation, rotation, and scale), or position and orientation, of a model object that best matches a target object located in image data. It does this through an iterative process by making small adjustments to the original position and orientation of the model object until it converges to a state that best matches the target object contained in the image data.

More particularly, the present invention is a system for determining the position and orientation of the target object in a digitized image. The system comprises an edge detector for processing the digitized image to produce edge data representative of edges of the target object. A model storage means is provided for storing a model of the target object that is to be detected, which target model comprises a plurality of data points disposed along edges of the model object. A minimum distance vector calculation means processes the edge data and model data to produce a set of minimum distance vectors between the model object and target object.

A neural network is employed for estimating translation, rotation, and scaling adjustments for the model object relative to the target object. Position and orientation adjustment means are employed for adjusting the position and orientation of the model object relative to the target object based upon the estimated translation, rotation, and scaling adjustments provided by the neural network. Iterative calculation of the minimum distance vectors, estimation of the translation, rotation, and scaling adjustments, and adjustment of the position and orientation of the model object is adapted to reposition and reorient the model object until it substantially overlays the target object. Final position and orientation of the model object provides an estimate of the position orientation of the target object in the digitized image.

The neural network may comprise a three layer perceptron trained by a backpropagation learning algorithm. The neural network may comprise 2 n input neurons, fifty hidden neurons, and four output neurons. Each output of the output neurons is typically interpreted in a trinary manner by the position and orientation adjustment means.

One method for determining the position and orientation of an object in the digitized image in accordance with the present invention comprises the following steps. The first step comprises processing the digitized image to produce edge data representative of edges of the target object. A model object that is to be detected is stored. The edge data and the model data are then processed for each data point in the model object relative to each point in the target object to produce a set of minimum distance vectors between the model object and the target object. The set of minimum distance vectors is processed using a neural network to estimate translation, rotation, and scaling adjustments that are to be made to the model. The position and orientation of the model object are adjusted relative to the target object based upon the estimated translation, rotation, and scaling adjustments. The last three steps are iterated until the model object substantially overlays the target object. This provides an estimate of the position and orientation of the target object in the digitized image.

The present system provides a solution to one computer vision object recognition problem. The present system could be designed to function as one module within a larger neural network automatic target recognition system under development by the assignee of the present invention. The system has several advantages over conventional approaches that may be applied to the same problem. For instance, the present system provides much better solutions than the gradient descent approach because it does not operate on an energy minimization principle. Therefore, the present invention overcomes a severe limitation found in many conventional approaches. The present system is also much more computationally efficient than either gradient descent or exhaustive search methods, and is much more feasible for implementation on a real time hardware system. The present system may be used to provide solutions within highdimensional problem spaces that are not practical using any other approach.

The present system can be of benefit to any system that achieves object recognition using computer vision. Some of the possible commercial applications include vision based factory automation systems, part inspection, and autonomous vehicle guidance.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1b illustrates a model object that is to be matched to the object in the image in FIG. 1a;

FIG. 7 illustrates training of the neural network of FIG. 6;

FIG. 8, comprising

FIG. 9 illustrates an example of a gradient descent local minima; and

FIG. 10, comprising

DETAILED DESCRIPTION

The position and orientation estimation problem addressed by the present invention is a subset of a general computer vision object recognition problem. The position and orientation estimation problem may be stated as follows. Given an image of a target object contained in a background, and a model object that is to be matched to the target object, what is the position and orientation (pose) for the model object that best matches the target object?

Figure 1A:
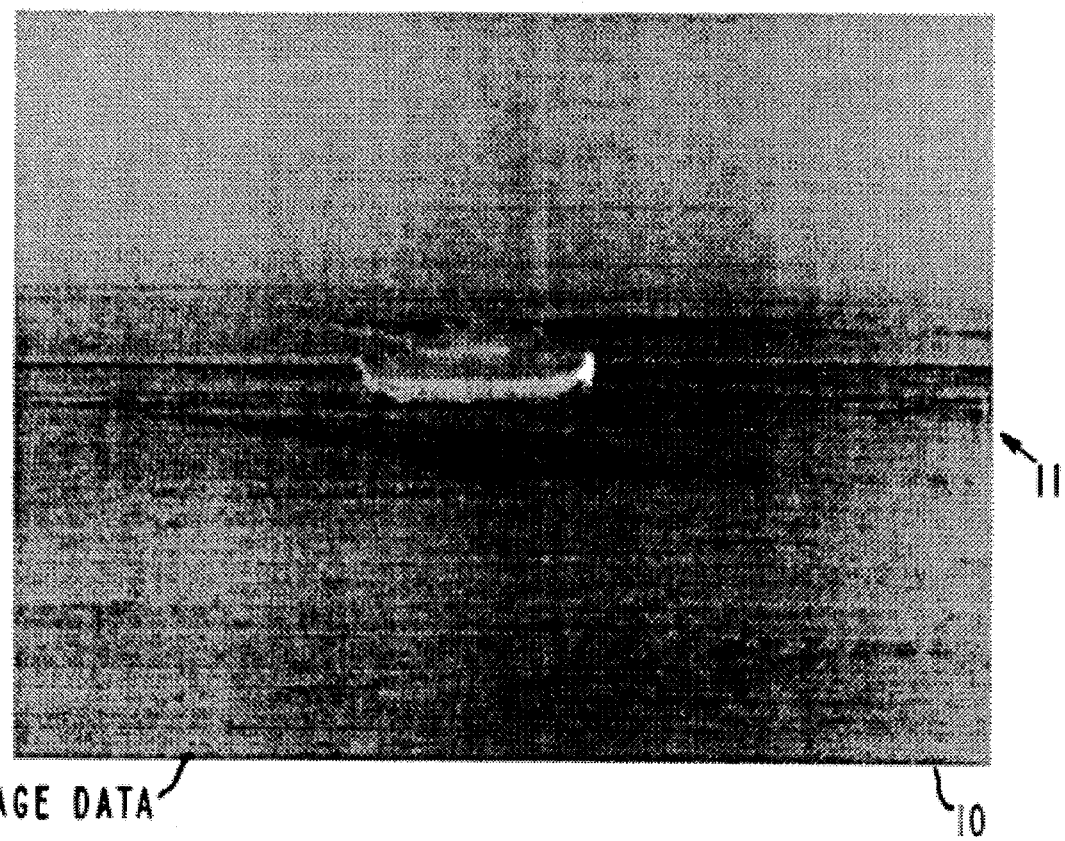
FIG. 1a illustrates a typical digitized video image of an object processed by the present invention.
Figure 1B:
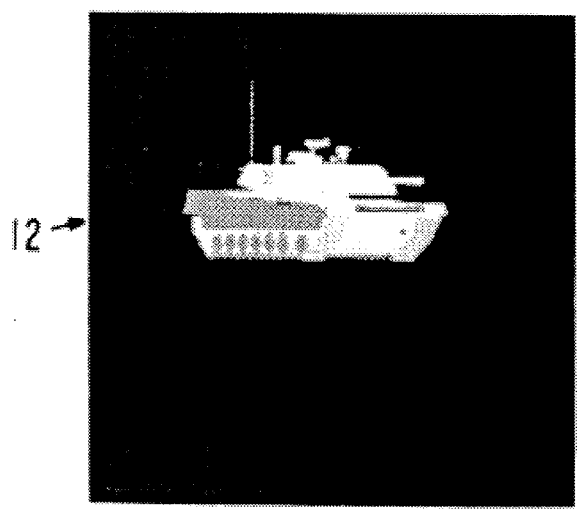
Figure 2:
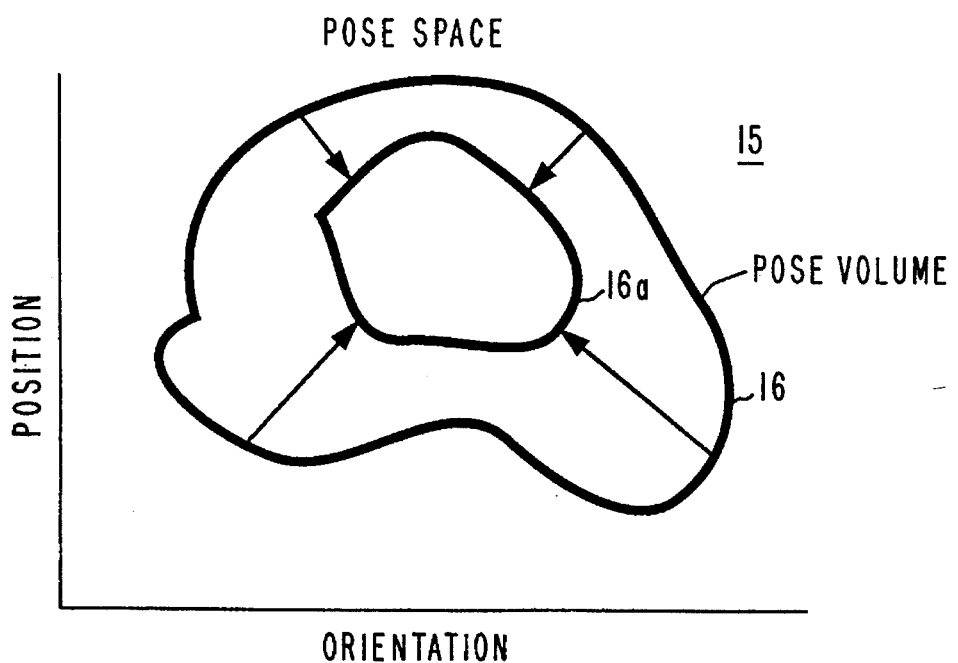
FIG. 2 illustrates a reduction in pose space achieved by the present invention.

Referring to the drawing figures, FIG. 1a illustrates a digitized video image 10 (or image data 10) of a target object 11 derived from an infrared FLIR system (not shown), and FIG. 1b illustrates a model object 12 of a vehicle that is to be matched to the target object 11 in the image 10 in FIG. 1a. In accordance with the principles of the present invention, answering the above question results in a reduction in the size of the position and orientation space 15 (or pose space 15) shown in FIG. 2, corresponding to the space containing possible position and orientations for the model object 12. Consequently, the better the answer, the smaller the resulting position and orientation space 15 as is illustrated in FIG. 2, which illustrates the reduction in pose space 15, or pose volume 16, achieved by the present invention. As such the pose volume 16 is reduced in size to provide a reduced pose volume 16a.

The region of six dimensional space of possible positions and orientations for the model object 12 is known as the pose volume 16. The initial size and shape of this volume 16 in pose space 15 is determined by apriori information regarding the image data 10. For instance, in an infrared (FLIR) image 10 of the target object 11, it is known that the target object 11 does not appear upside down or in a vertical orientation. In addition, it is also known that the target object 11 must be located somewhere within the boundaries of the image 10 (FLIR field of view). The extent of the initial pose volume 16 is thus limited by this information. Finding the best pose for the model object 12 is equivalent to reducing the size of the pose volume 16, as illustrated in FIG. 2. Ideally the pose volume 16 is reduced to a single point. The present invention is able to reduce a pose volume 16 in four dimensions, comprising three dimensions of position and one of orientation, to a point. It reduces the dimensionality of the pose volume 16 from six to two. The two remaining dimensions of the pose volume 16 are pitch and ground plane rotation.

Figure 3:
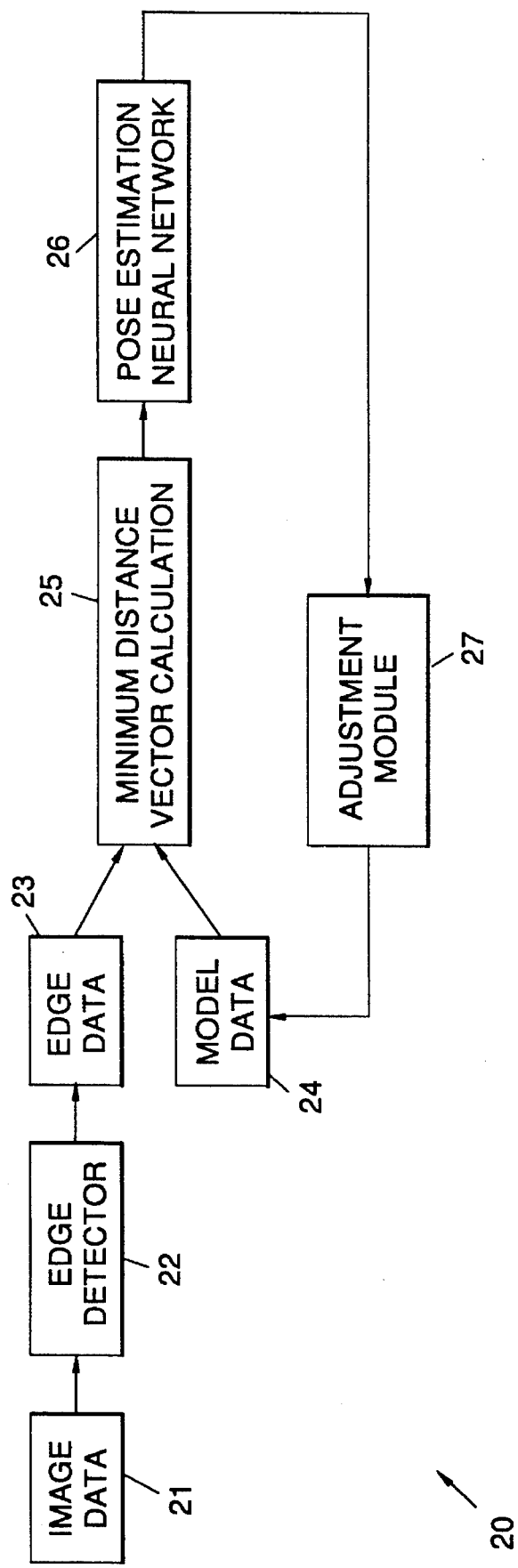
FIG. 3 illustrates a position and orientation estimation neural network system in accordance with the principles of the present invention.

FIG. 3 illustrates a position and orientation estimation neural network system 20 in accordance with the principles of the present invention. The position and orientation estimation neural network system 20 is adapted to process digitized image data 21 that is derived from a video source (not shown), such as a forward looking infrared (FLIR) system. The digitized image data 21 is processed by an edge detector 22 to produce edge data 23 (or an edge image 23) representative of edges of the target object 11 present in the image data 10. Model objects 12, also referred to as model data 24, that are representative of target objects 11 that may be present in the image data 21, are stored, such as in a database, for example. The model data 24 comprises a single set of data points located along the edges of model objects 12. The edge data 23 and the model data 24 are processed such that minimum distance vector calculations 25 are performed for each data point in the model object 12 relative to each point in the edge data 23. Outputs of the minimum distance vector calculation 25 are applied to a neural network 26 that is adapted to estimate translation, rotation, and scaling adjustments that are to be made to the model data 24. Outputs of the neural network 26 are applied to position and orientation (pose) adjustment module 27 that adjusts the position of the model data 24 relative to the edge data 23 of the target object 11 to reposition the model object 12 with respect to the target object 11 based upon the latest calculations provided by the neural network 26. Iterations are made during subsequent processing cycles until the model data 24 overlays the edge data 23 representing the target object 11.

Figure 4:
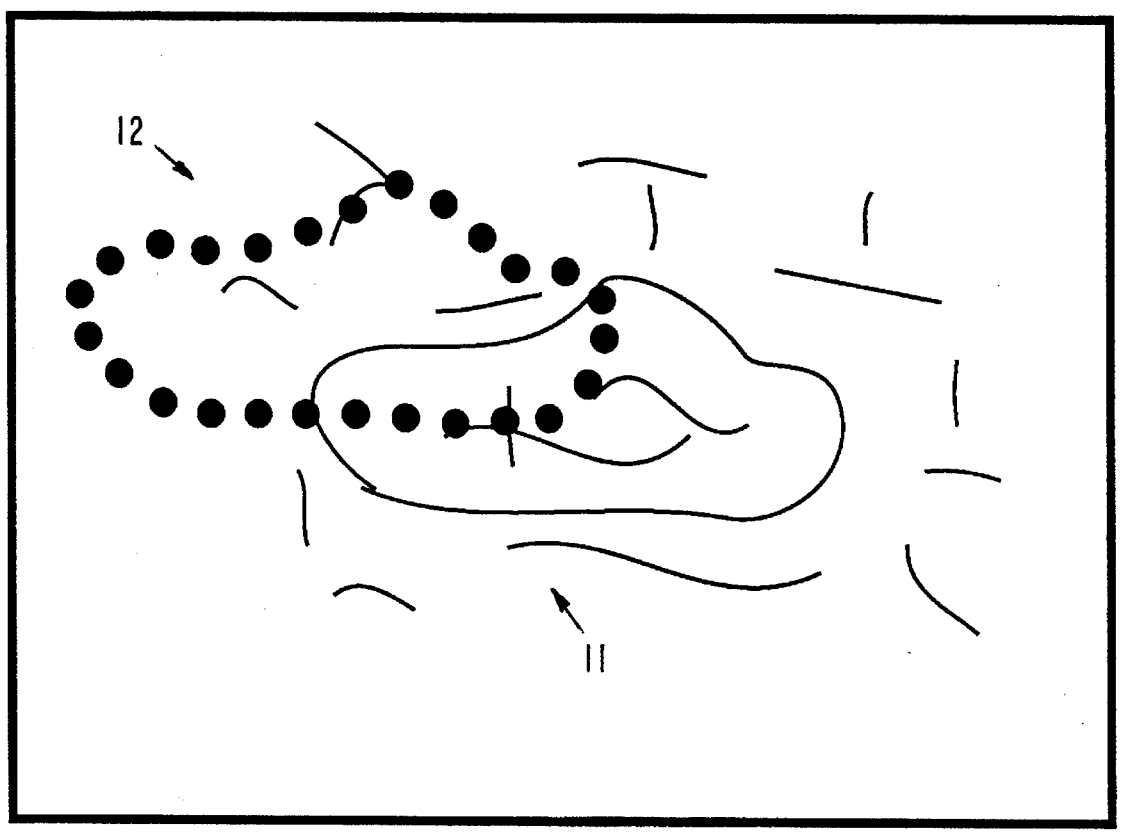
FIG. 4 shows a sampled contour model used by the system of FIG. 3.

More specifically, and during operation of the system 20, an edge image of the input data image 10 corresponding to the object 12 is formed by the edge detector 22. The edge detector 22 may be implemented by using a regularization network, for example. A sampled contour model object 12 is then placed in the image 10. This sampled contour model object 12 corresponds to the model object 12 that the system 20 adjusts. The sampled contour model object 12 is created by sampling every sixth contour point around the complete contour of the model object 12, as is illustrated in FIG. 4. More specifically, FIG. 4 shows the sampled contour model object 12 that may be used by the system 20. The system 20 adjusts the model object 12 from an initial position in the image 10 to a final position in an iterative manner, making small changes that accumulate over many cycles. The model object 12 converges to a final position that corresponds to a position and orientation estimate for the target object 11 in the image 21. It has been found that the system 20 operates very successfully in four dimensions. It effectively adjusts translation, rotation, and scale of the model object 12 to provide for the correct position and orientation of the target object 11. These changes in model translation, rotation, and scale within the two dimensional image 21 correspond to projected changes in position and orientation in the original six dimensional pose space 15 defined above.

Figure 5:
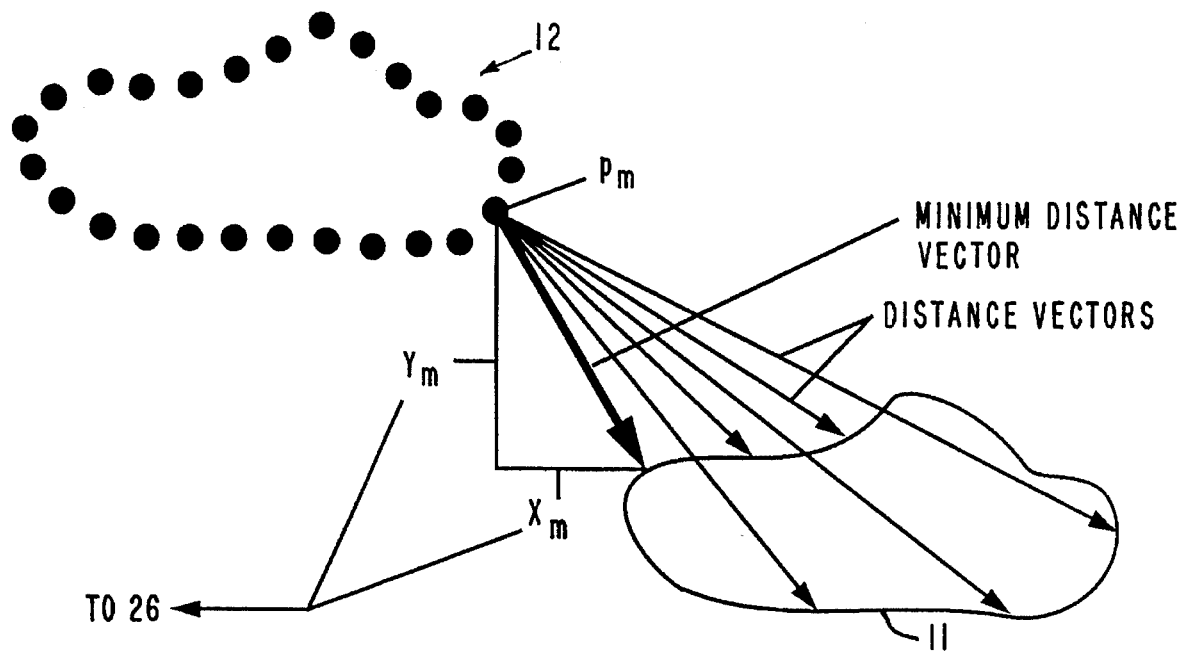
FIG. 5 shows a typical minimum distance vector calculation.

FIG. 5 illustrates a typical minimum distance vector calculation. At the beginning of a processing cycle, a minimum distance vector calculation is used to preprocess the image data 10 for input to the neural network 26. It is used to represent the model-to-data closeness of match for input into the neural network 26. This geometrical relationship between the model object 12 and the data 10 is first determined by forming vectors between each point in the model object 12 and the nearest data point to it. The x and y components of these vectors, as computed from a reference frame attached to the model object 12, are then used as input to the neural network 26.

Figure 6:
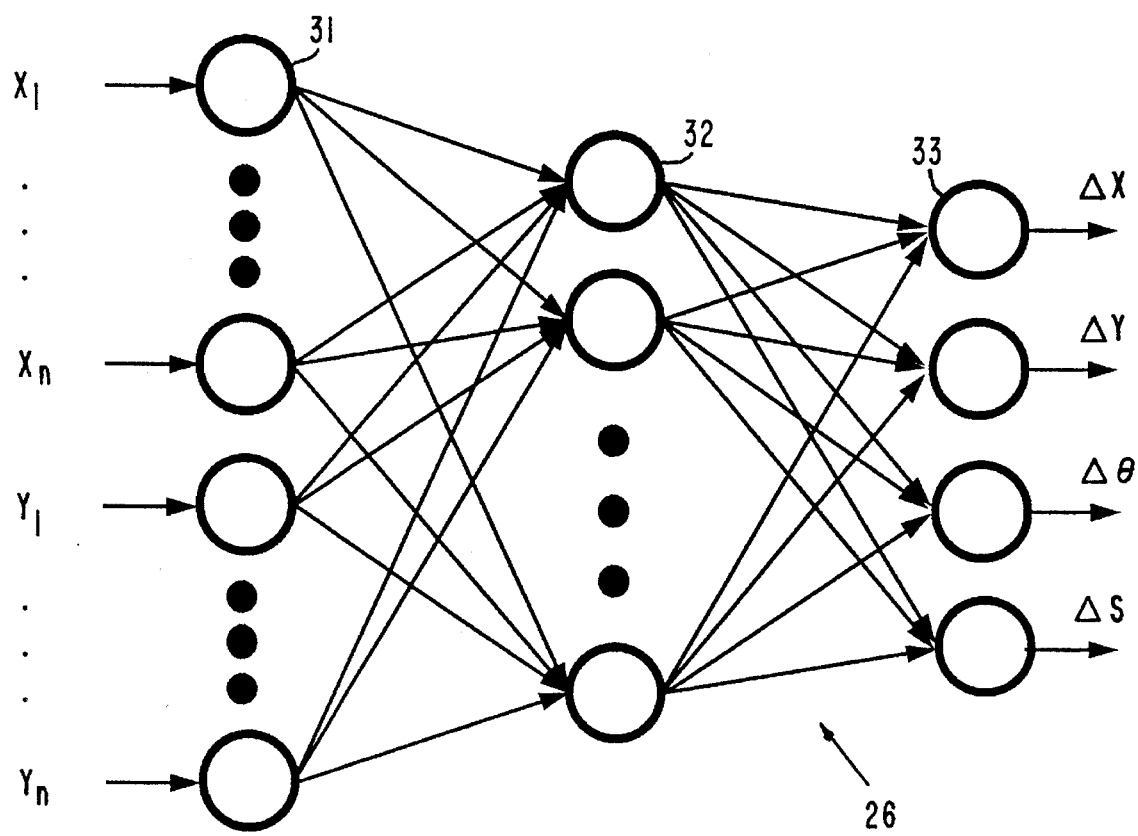
FIG. 6 illustrates the neural network employed in the system of FIG. 3.
Figure 8A:
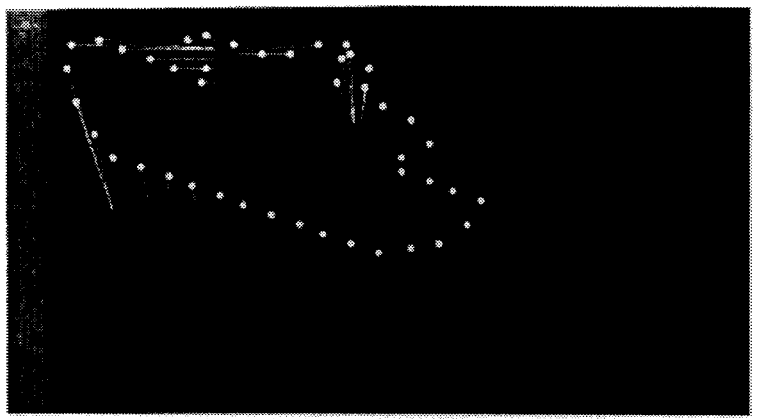
FIGS. 8a–8d, shows data illustrative of a test of the system of FIG. 4 on simulated M1 tank data.
Figure 8B:
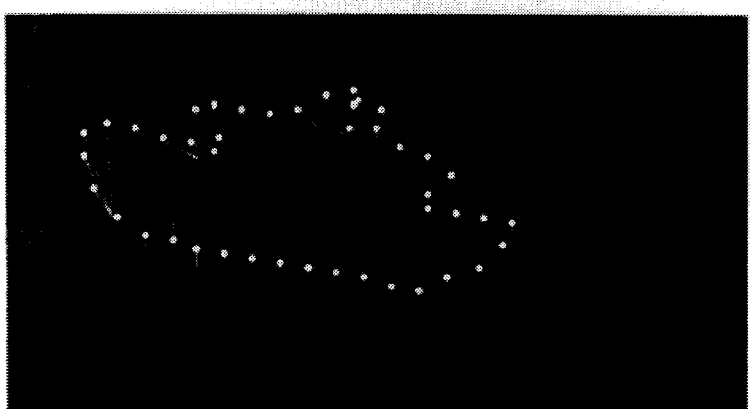
Figure 8C:
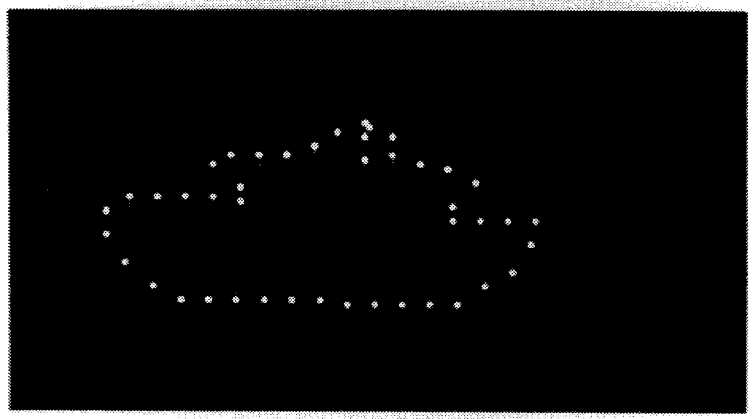
Figure 8D:
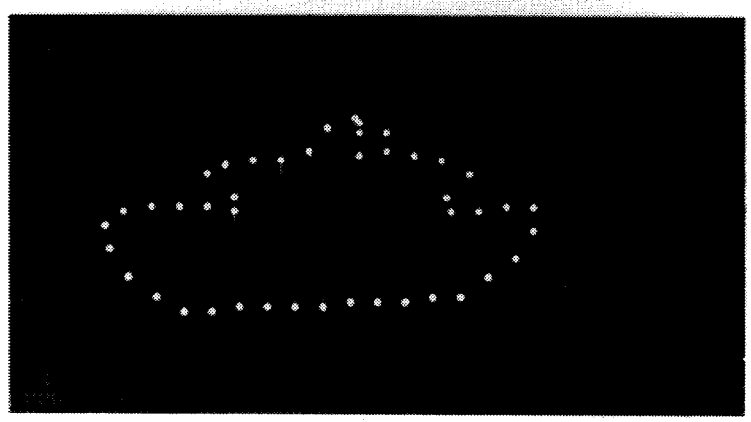
Figure 10A:
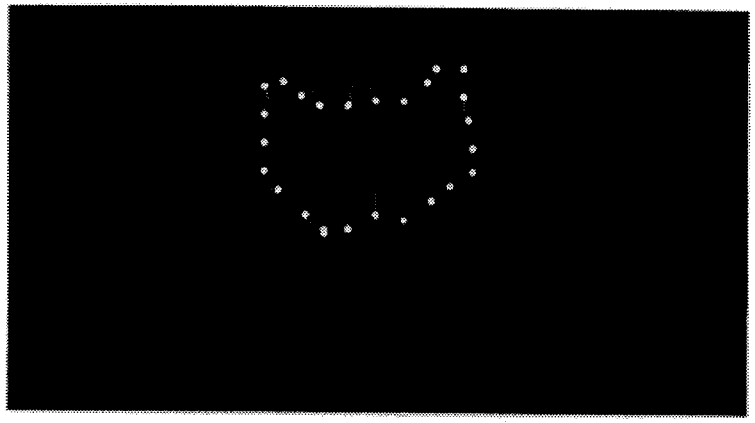
FIGS. 10a–10h, shows operation of the present invention on simulated T62 tank.
Figure 10B:
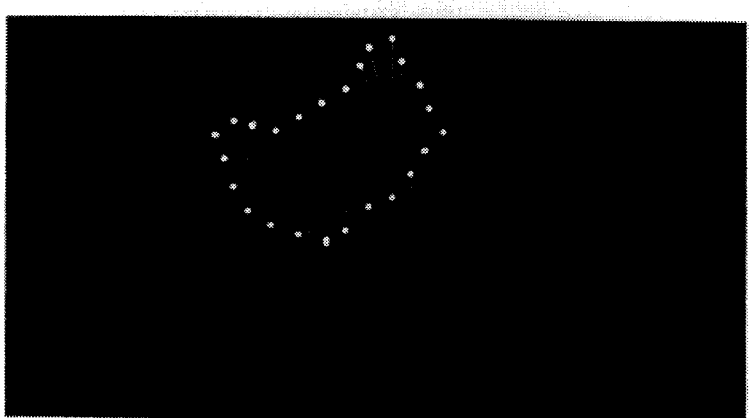
Figure 10C:
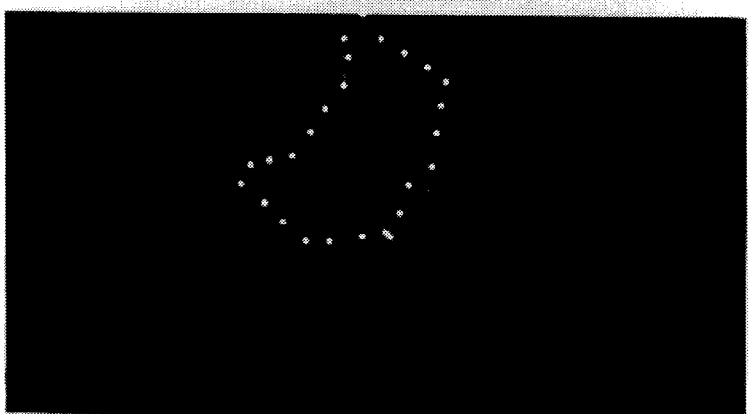
Figure 10D:
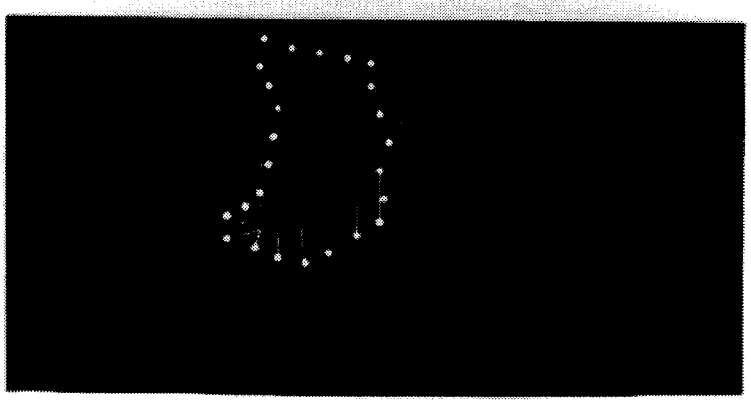
Figure 10E:
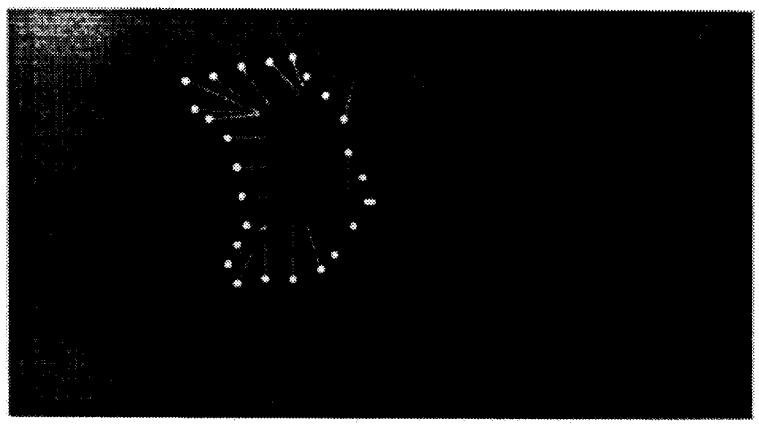
Figure 10F:
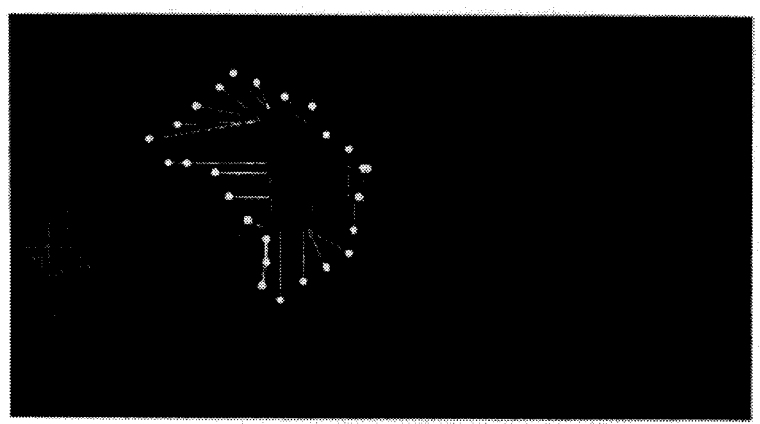
Figure 10G:
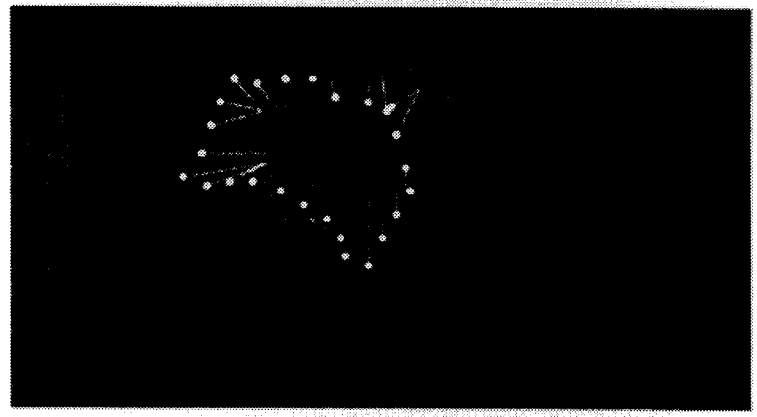
Figure 10H:
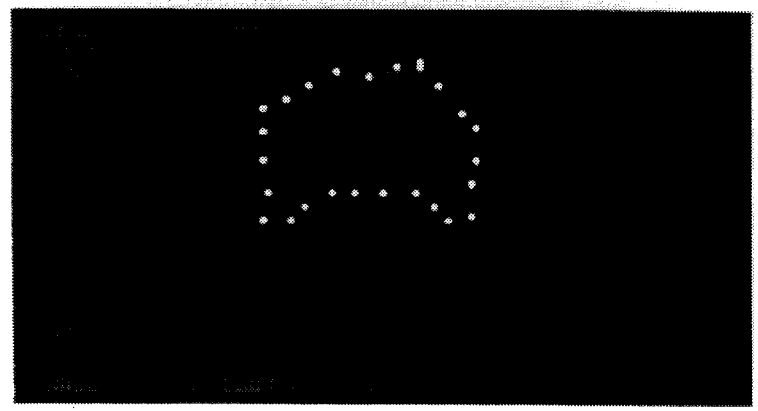

FIG. 6 illustrates the neural network 26 employed in the system 20. The neural network 26 used in the system 20 is a three layer perceptron trained by a backpropagation learning algorithm. The neural network 26 comprises 2 n input neurons (where n is the number of model points in the sampled contour model) 31, for example, fifty intermediate neurons 32, for example, and four output neurons 33 (corresponding to $\Delta x$, $\Delta y$, $\Delta \theta$, and $\Delta s$). Each of the outputs of the output neurons 33 is interpreted in a trinary manner by the position and orientation adjustment module 27 which then executes the pose adjustment. In this manner, the neural network 26 is capable of accurately traversing a complex four dimensional state space in a relatively small number of iterations by outputting small pose corrections or adjustments at each iteration.

The position and orientation adjustment module 27 interprets the output of the neural network 26 and adjusts the position and orientation of the model object 12 accordingly. The model object 12 may be translated in x and y directions, rotated, or scaled. The trinary output of each output neuron 33 is (−1,0,1). An output of plus or minus one is interpreted as adjustments of plus or minus one pixel for translation, plus or minus one degree for rotation, or plus or minus one percent for scale. A zero output corresponds to no adjustment at all. The rules for performing the adjustments are given below. After each adjustment is performed, a new set on minimum distance vectors is computed and the cycle repeats until the system 20 reaches a state of convergence, yielding a final pose estimate for the object 12 in the image data 10. The specific pose adjustments employed in the system 20 are given below. It is to be understood that the system 20 is not limited to these specific adjustments.

If $0.5 > O_x > 0.2$ then $x_i = x_i + 1$ for all model points $P_i$.

If $0.2 > O_x > -0.2$ then $x_i = x_i$ for all model points $p_i$.

If $-0.2 > O_x > -0.5$ then $x_i = x_i - 1$ for all model points $p_i$.

If $0.5 > O_y > 0.2$ then $y_i = y_i + 1$ for all model points $p_i$.

If $0.2 > O_y > -0.2$ then $y_i = y_i$ for all model points $p_i$.

If $-0.2 > O_y > -0.5$ then $y_i = y_i - 1$ for all model points $p_i$.

If $0.5 > O_\theta > 0.2$ then $p_i = R_c(+1)p_i$ for all model points $p_i$.

If $0.2 > O_\theta > -0.2$ then $p_i = p_i$ for all model points $p_i$.

If $-0.2 > O_\theta > -0.5$ then $p_i = R_c(-1)p_i$ for all model points $p_i$.

If $0.5 > O_s > 0.2$ then $p_i = S_c(+1)p_i$ for all model points $p_i$.

If $0.2 > O_s > -0.2$ then $p_i = p_i$ for all model points $p_i$.

If $-0.2 > O_s > -0.5$ then $p_i = S_c(-1)p_i$ for all model points $p_i$.

The neural network 26 is trained by presenting sampled contour model objects 12 that are randomly translated, rotated, and scaled away from the full contour model object 12 as is shown in FIG. 7. The input to the neural network 26 is obtained as the minimum distance vectors are computed, while the desired output of the neural network 26 is known to be in the opposite direction of the pose adjustment of the sampled model object 12. For example, if the model object 12 is rotated +10 degrees, then the desired output of the rotation output neuron 33 is −1. The weights of the neural network 26 are then updated using the back-propagation supervised learning algorithm after each randomly adjusted sampled model presentation. The ease with which training occurs is greatly increased by the use of a quantized trinary output (−1,0,1) for the neural network 26. Correct adjustment decisions need only be learned while correct adjustment magnitudes need not be learned.

With reference to FIG. 7, several different neural networks 26 were trained with a varying number of hidden (intermediate) neurons 32 and output neurons 33. Several different views of two different vehicles 11 at different ground plane orientations were used as model objects 12. For a typical training set, the range of sampled model pose adjustment was plus or minus twenty pixels in translation, plus or minus 180 degrees in rotation, and plus or minus twenty percent in scale. However, in practice experiments demonstrated that the actual operating limits of the system 20 extend beyond the limits of the training set. The generalization ability of the system 20 is good because of the thresholding effect of sigmoid activation functions of the input neurons 31.

The system 20 performed perfectly on the training model objects 12, which indicates that the neural network 26 is able to completely learn the training set. Additional tests were performed on a test set that comprised the original training model data with noise and occlusion added. Referring to FIG. 8, comprising FIGS. 8a–8d, data illustrative of a test of the system 20 on simulated vehicle data is provided. FIGS. 8a–8d show data representative of position and orientation at four different times (after differing numbers of iterations: namely 0, 10, 20, and 29, respectively) of the system 20. Using this simulated data, the sampled model object 12 is required to converge to the correct matching pose in the presence of internal edges, additional extremities on the contour, and a partially occluded bottom boundary. This example shows the system 20 to possess several advantageous performance characteristics. It has good tolerance for the appearance of additional internal edges with the ability to move through it without getting stuck. It operates robustly with missing contour edges and is simultaneously able to handle additional target structure, while making accurate adjustments in translation, rotation, and scale.

Compared to conventional approaches to the same problem, the system 20 has several important advantages. The conventional exhaustive search approach gives optimal answers but it is very computationally burdensome. The conventional gradient descent approach is faster than the exhaustive search approach but has local minima problems. The system 20 is both fast and avoids local minima. This superior performance is due to the ability of the system 20 to train. Training allows the system 20 to base pose adjustment decisions on the actual pattern of the minimal distance vector input instead of some measure of their combined cost or energy as used in gradient descent. As a result, the system 20 avoids local minima that trap the gradient descent approach because it is does not work on an energy minimization principle.

The performance of the system 20 in comparison to the gradient descent approach is also accentuated by the very poor performance of the gradient descent approach in determining correct rotational adjustments. For comparative purposes, FIG. 9 illustrates an example of conventional gradient descent local minima. Other local minima in this example appear at approximately every five degrees of model rotation about its centroid, severely limiting the usefulness of the gradient descent approach for making rotational adjustments. In comparison, the convergence range for rotational displacement of the system 20 is much greater than that of the gradient descent approach as is shown in FIG. 10. More specifically, FIG. 10, comprising FIGS. 10a–10h, shows operation of the system 20 on a different simulated vehicle. FIGS. 10a–h show data representative of position and orientation at eight different times (after differing numbers of iterations: namely 0, 25, 50, 75, 100, 125, 150, and 178, respectively) of the system 20. The system 20 is able to correct the pose of the model object 12 even though its initial position was completely upside down, a 180 degrees away from the correct result.

A comparison of the computational requirements for the system 20, gradient descent approach, and exhaustive search approach reveals sharp differences in efficiency. The system 20 is superior to the other two approaches by at least an order of magnitude or more. For the comparison, it is assumed that the difference in computation time required for each approach is due primarily to the difference in the number of times each approach must execute the minimal distance vector calculation. All other differences are assumed to be negligible for the purposes of this comparison. The system 20 only needs to do one set of minimum distance vector calculations per iteration. It does this for an estimated average of fifty iterations before reaching its convergence point. The gradient descent approach requires one set of minimum distance vector calculations for each possible adjustment direction. There are a total of 81 possibilities computed from the product of nine possible translations including the option not to translate, three rotation options, and three scaling options. It is also assumed that gradient descent approach requires about fifty iterations to converge. The exhaustive search approach, assuming adjustments within plus or minus twenty units for each degree of freedom, results in 256,000 necessary minimum distance vector calculations. The final comparison of the computational efficiency of system 20 versus the gradient and exhaustive search approaches results in a ratio of 1:81:5120.

Although originally designed for automatic target recognition, the system 20 may be by adapted for use with any system that utilizes object recognition by means of computer vision. Some of the applications of the present invention include visionbased factory automation systems, part inspection systems, and autonomous vehicle guidance systems.

Thus there has been described a new and improved position and orientation estimation neural network system. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A system for determining the position and orientation of a target object in a digitized image, said system comprising:

an edge detector for processing the digitized image to produce edge data representative of edges of the target object;

model storage means for storing model data corresponding to a model object of the target object that is to be detected, which model data comprises a plurality of data points disposed along edges of the model object;

minimum distance vector calculation means for processing the edge data and the model data to produce a set of minimum distance vectors between the target object and the model object;

a neural network, responsive to the minimum distance vector calculation means, for estimating distortions of the model object relative to the target object; and position and orientation adjustment means, responsive to the neural network and the model storage means, for adjusting the position and orientation of the model object relative to the target object based upon the distortions estimated by the neural network;

wherein iterative calculation of the minimum distance vectors, estimation of the distortions, and adjustment of the position of the model object is adapted to reposition and reorient the model object until the model object substantially overlays the target object, whereby the final position and orientation of the model object provides an estimate of the position and orientation of the target object in the digitized image.

2. The system of claim 1 wherein the neural network comprises a three layer perceptron trained by a back-propagation learning algorithm.

3. The system of claim 1 wherein the neural network comprises 2 n input neurons, fifty hidden neurons, and four output neurons, where n is the number of model points in the sampled contour model.

4. The system of claim 3 wherein each output of the output neurons is interpreted in a trinary manner by the position and orientation adjustment means.

5. A method for determining the position and orientation of a target object in a digitized image, the digitized image being represented by an electrical signal, said method comprising the steps of:

processing the signal of the digitized image to produce edge data representative of edges of the target object;

storing a model object of the target object that is to be detected, which model object comprises a plurality of data points disposed along edges of the model object;

processing the edge data and the model data for each data point in the model object relative to each point in the target object to produce a set of minimum distance vectors between the model object and the target object;

processing the set of minimum distance vectors using a neural network to estimate translation, rotation, and scaling adjustments that are to be made to the model object that are adapted to translate, rotate, and scale the model object relative to the target object; and adjusting the position and orientation of the model object relative to the target object based upon the estimated translation, rotation, and scaling adjustments;

iterating the last three steps to successively reposition and reorient the model object until it substantially overlays the object, thus providing an estimate of the position and orientation of the target object in the digitized image.

6. A method for determining pose of a target in a digitized image, said method comprising the steps of:

generating signals indicating minimum distance vectors between an edge image of a target and an edge image of a model;

determining orientation adjustments to the edge image of the model by processing the signals indicating the minimum distance vectors with a neural network; and adjusting the edge image of the model until the edge image of the model substantially overlays the edge image of the target, whereby the final position of the model indicates the pose of the target.

7. The method of claim 6, wherein the minimum distance vectors are determined by processing the edge data for the target and model relative to each data point of the edge data for the target.

8. The method of claim 6, wherein the edge image of the model is adjusted for rotation, translation and scale.

9. The method of claim 6, wherein the edge image of the model is adjusted from an initial position to a final position in an iterative manner.

10. The method of claim 9, wherein the step of adjusting includes repeating the steps of determining the minimum distance vectors, estimating the adjustments, and adjusting the edge image of the model.

11. The method of claim 6, wherein the neural network is initially trained with a plurality of different objects.

12. The method of claim 11, wherein the output of output neurons of the neural network are interpreted in a trinary manner.

13. The system of claim 1, wherein the distortions estimated by the neural network include translation, rotation and scale.

* * * * *